US007701923B2

United States Patent
Kuehner (10) Patent No.: US 7,701,923 B2
(45) Date of Patent: Apr. 20, 2010

(54) METHOD AND APPARATUS FOR FRAME SYNCHRONIZATION IN A COMMUNICATION NETWORK

(75) Inventor: Nathanael P. Kuehner, Markham (CA)

(73) Assignee: Motorola, Inc., Schaumburg, IL (US)

( * ) Notice: Subject to any disclaimer, the term of this patent is extended or adjusted under 35 U.S.C. 154(b) by 951 days.

(21) Appl. No.: 11/456,375

(22) Filed: Jul. 10, 2006

(65) Prior Publication Data

US 2008/0008156 A1 Jan. 10, 2008

(51) Int. Cl.
*H04J 3/06* (2006.01)
*H04B 7/00* (2006.01)
*H04B 7/212* (2006.01)

(52) U.S. Cl. .................. 370/350; 370/347; 455/502; 455/503

(58) Field of Classification Search .......... 370/347, 370/350, 508; 455/447, 450, 560, 561, 502, 455/503
See application file for complete search history.

(56) References Cited

U.S. PATENT DOCUMENTS 6,493,539 B1 * 12/2002 Falco et al. ............ 455/67.11
6,667,963 B1 * 12/2003 Rantalainen et al. ...... 370/337
7,319,686 B1 * 1/2008 Lu et al. ................ 370/338

OTHER PUBLICATIONS

Mills, David L., Network Working Group, RFC 1305—Network Time Protocol, Mar. 1992.
Information Technology—Telecommunications and Information Exchange Between Systems—Local and Metroplitan Area Networks—Specific Requirements—Part 11: Wireless LAN Medium Access Control (MAC) and Physical Layer (PHY) Specifications, ANSI/IEEE STD 802.11, 1999 Edition (R2003).
802.11 WLAN Mesh Synchronization Proposal/802.11 IBSS Mode, Jun. 2006.

* cited by examiner

*Primary Examiner*—George Eng
*Assistant Examiner*—Wesley L Kim
(74) *Attorney, Agent, or Firm*—Valerie M. Davis; Anthony P. Curtis (57) ABSTRACT

A method and apparatus for frame synchronization in a communication network is provided. The communication network includes a plurality of base stations. The method includes determining the start time of reception of a downlink frame received from each of at least a second base station. The method also includes determining the radio frequency propagation delay associated with the downlink frame received from the each of at least a second base station. Further, the method includes determining the reference downlink frame transmission time at the first base station, based on the reception start time of the downlink frame and the radio frequency propagation delay associated with one of the at least a second base station.

20 Claims, 6 Drawing Sheets

METHOD AND APPARATUS FOR FRAME SYNCHRONIZATION IN A COMMUNICATION NETWORK

FIELD OF THE INVENTION

This invention relates generally to communication networks, and more particularly, to a method and apparatus for frame synchronization in a communication network.

BACKGROUND OF THE INVENTION

With an increased need for communication and information exchange, communication networks are becoming increasingly popular. Communication networks enable users to share resources and communicate among themselves. There are different types of communication networks, for example, wireless communication networks and computer networks. Some examples of wireless communication networks include Global System for Mobile Communication (GSM) networks, Time Division Multiple Access (TDMA) networks, Code Division Multiple Access (CDMA) networks, IEEE 802.16d ('fixed WiMAX') networks, and IEEE 802.16e ('mobile WiMAX') networks. A wireless communication network includes one or more base stations and one or more mobile devices. The wireless communication network covers a region that can be divided into cells. A base station is employed in each cell. A cell is an area in which the base station supports wireless communication between the one or more mobile devices. Some examples of mobile devices include mobile phones, Personal Digital Assistants (PDAs), laptop computers, and so forth. In wireless technologies, for example, in IEEE 802.16d and IEEE 802.16e, the uplink and downlink frames of each base station must be synchronized with other base stations to minimize co-channel interference. As a result, the base stations that are transmitting frames do not interfere with other base stations' frame reception from mobile devices in the network. The base station synchronization prevents collisions between the transmitted frames of base stations and the transmitted frames of mobile devices, and hence improves the throughput of the base station and increases network capacity.

In accordance with a known technique, base stations can be synchronized by using a Global Positioning System (GPS). A GPS receiver which provides a GPS timing reference is connected to each base station. The timing reference can be estimated from the signals received from the one or more GPS satellites. All base stations schedule their transmission events exactly at the same GPS time instant. However, the GPS receivers are expensive to produce, install, and maintain. Further, GPS signals are not always clear in all types of coverage areas, notably including dense urban areas, inside buildings, or underground. As a result, base stations located in such areas may not receive a very clear GPS signal. Consequently, the GPS receiver may fail to facilitate the timing signal in busy areas. Moreover, the failure of the GPS receiver can result in the failure of the timing in the base station.

Therefore, there exists a need for a method and apparatus that synchronizes transmission of frames by the base stations, without the need for external timing reference, such as, a Global Positioning System (GPS). Further, there exists a need for synchronization of the transmission of frames by base stations, with low production, installation and maintenance cost.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention

DETAILED DESCRIPTION OF THE INVENTION

Before describing in detail embodiments that are in accordance with the present invention, it should be observed that the embodiments reside primarily in combinations of method steps and apparatus components related to method and apparatus for frame synchronization in a communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well understood elements that are useful or necessary in a commercially feasible embodiment may not be depicted in order to facilitate a less obstructed view of these various embodiments.

It will be appreciated that embodiment of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non processor circuits, some, most, or all of the functions of the method and apparatus for frame synchronization in a communication network described herein. The non processor circuits may include, but are not limited to, a radio receiver, a radio transmitter and user input devices. As such, these functions may be interpreted as steps of a method and apparatus for frame synchronization in a communication network described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment of the present invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device and a magnetic storage device. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the present invention describes a method and apparatus for frame synchronization in a communication network. The method includes determining a start time of the reception of a downlink frame at a first base station, received from each of at least a second base station. The method also includes determining, at the first base station, a radio frequency propagation delay associated with the downlink frame received from each of at least a second base station. A reference downlink frame transmission start time is estimated based on the start time of the reception of the downlink frame and the radio frequency propagation delay associated with one of the at least a second base station. The reference downlink frame is used to synchronize transmissions of downlink frames of the first base station with the transmissions of downlink frames of one of the at least a second base station.

The present invention also describes an apparatus for frame synchronization in a communication network. The first base station apparatus includes a transceiver and a processing device. The transceiver receives a downlink frame in a first base station from each of at least a second base station. The processing device is operatively coupled to the transceiver and determines a start time of reception of the downlink frame. The processing device also determines a radio frequency propagation delay associated with the downlink frame received from each of at least a second base station. Further, the processing device determines a reference downlink frame transmission start time based on the reception start time of the downlink frame and the radio frequency propagation delay. The reference downlink frame is used to synchronize the transmission of downlink frames of the first base with that of the downlink frames of at least a second base station.

Various embodiments provide a method and apparatus for frame synchronization in a communication network. The base stations in the communication network synchronize their frame transmission without the need for deploying GPS receivers at the base stations. Further, the frame synchronization is achieved without relying on any external timing source. The frames are synchronized without any hardware modification being made to existing networks. Further, the timing clock at the base stations can be adjusted in operating conditions, for example, without shutting down transmission and reception of frames. Those skilled in the art will realize that the above recognized advantages and other advantages described herein are merely exemplary and are not meant to be a complete rendering of all of the advantages of the various embodiments of the present invention.

Figure 1:
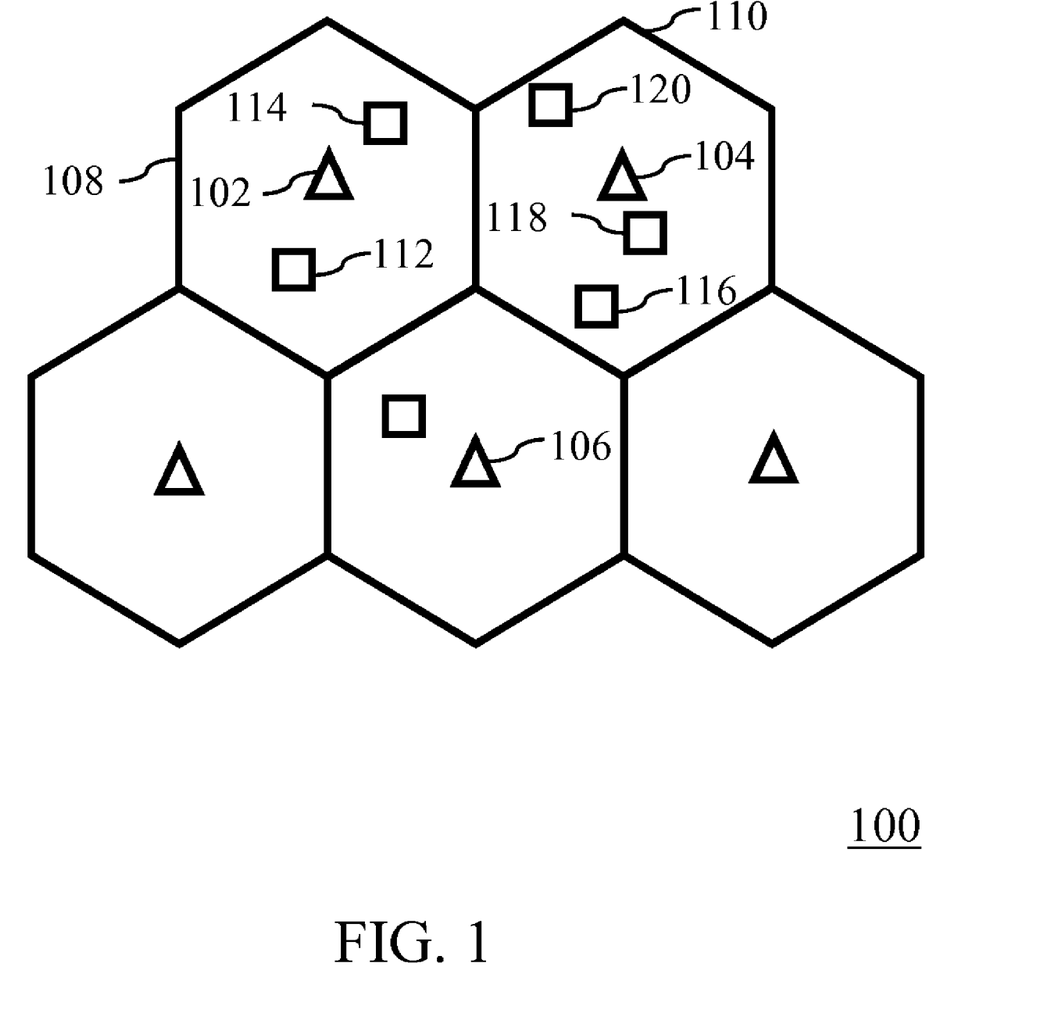
FIG. 1 illustrates an exemplary communication network implementing embodiments of the present invention.

Referring now to the drawings, and in particular FIG. 1, for purposes of providing an illustrative but non-exhaustive example to facilitate this description, a specific operational paradigm, using a communication network, is shown and indicated generally as communication network 100. Those skilled in the art, will, however, recognize and appreciate that the specifics of this illustrative example are not the specifics of the invention itself, and that the teachings set forth herein are applicable in a variety of alternative settings. For example, since the teachings described do not depend on any particular platform, they can be applied to any type of system, such as, but not limited to, Code Division Multiple Access (CDMA) systems, Time Division Multiple Access (TDMA) systems, Universal Mobile Telecommunications Systems (UMTSs), General Packet Radio Service (GPRS) systems, IEEE 802.16d systems, IEEE 802.16e systems, Internet Protocol-based systems, and non-cellular network systems. As such, other alternative implementations, using different types of communication networks that include the feature of synchronizing transmission of frames are within the scope of the various teachings described.

Referring now to the exemplary communication network 100, shown in FIG. 1, the communication network 100 includes a plurality of base stations, for example, base stations 102, 104 and 106, and a plurality of mobile devices, for example, mobile devices 112, 114, 116, 118 and 120. A communication network can be divided into cells. A base station can be employed in each cell, a cell being an area in which the base station supports wireless communication between the one or more mobile devices. For example, as shown in FIG. 1, network 100 is shown divided into five cells (two of which are labeled 108 and 110). However, those skilled in the art will realize that the number of cells into which the network is divided may be fewer or more depending on various factors including, but not limited to, cost considerations of a service provider, and an expected maximum number of users of system 100. The base station 102 is employed in cell 108 and the base station 104 is employed in cell 110.

The base station 102 supports wireless communication to and from mobile devices, for example, mobile devices 112 and 114 in the cell 108. Similarly, the base station 104 supports wireless communication to and from mobile devices, for example, mobile devices 116, 118 and 120 in the cell 110. Each of the base stations, for example the base stations 102, 104 and 106, enable transfer of data over the communication network 100. The base stations 102, 104 and 106 can further communicate among other base stations to facilitate communication between the mobile devices in their respective cells. For example, the base stations 102 and 104 can communicate with each other to facilitate communication between mobile devices 112 114, 116, 118 and 120.

Moreover, in FIG. 1, the base stations 102, 104 and 106 use internal clock systems and pre-assigned time slots for transferring data over a communication network 100. So, to facilitate communication between the base stations and the mobile devices within the respective cells of the base stations, the transmission and reception times of the base stations are desirably synchronized. In other words, the downlink frames (or frames from base stations to mobile devices) from all of the base stations are transmitted at substantially the same time as each other such that the uplink frames (or frames from the mobile devices to the base stations) can be received by the base stations at times ideally when none of the base stations are transmitting. The synchronization of the uplink and downlink frames minimizes co-channel interference and maximizes channel efficiency.

Figure 2:
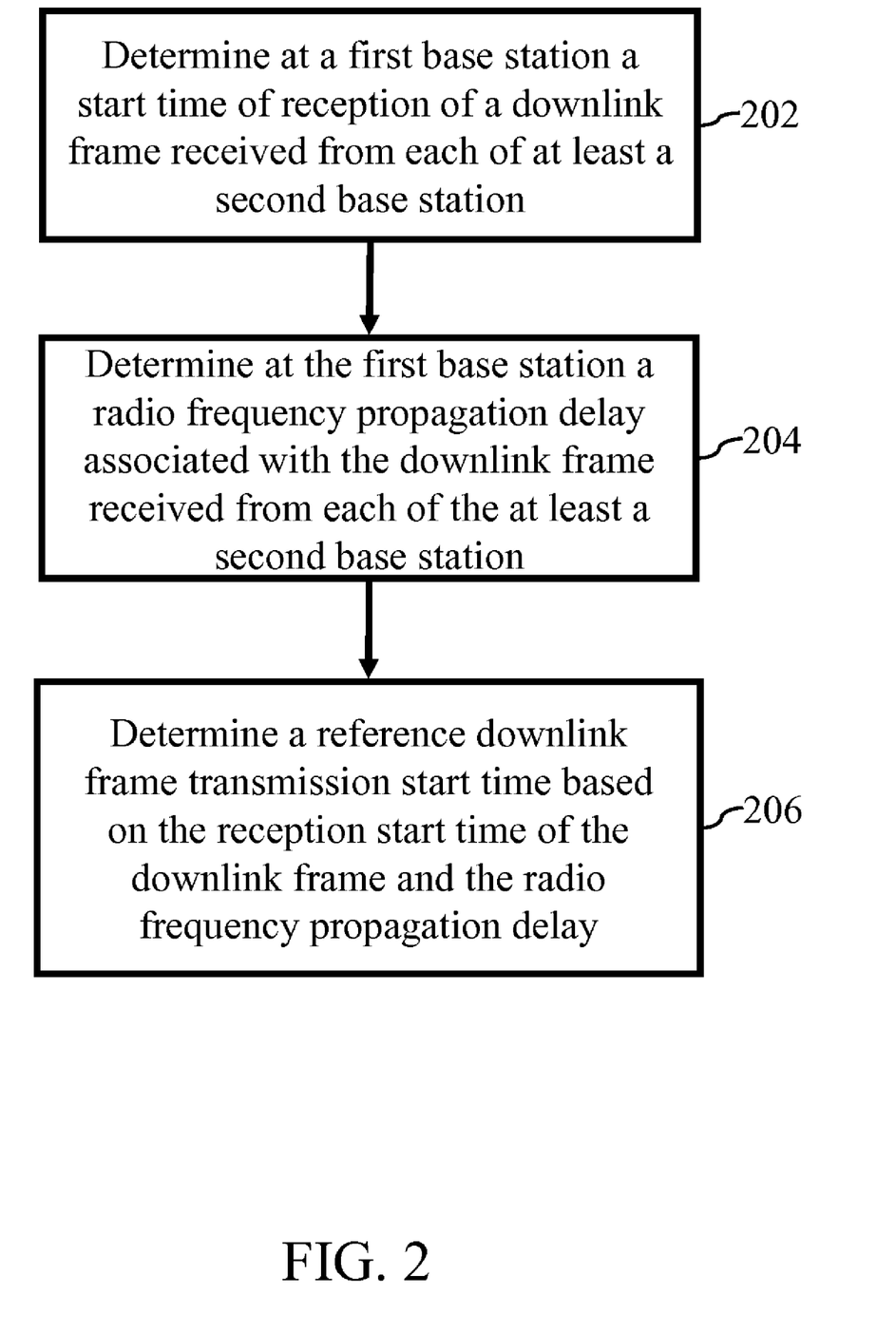
FIG. 2 is a flow diagram illustrating a method for frame synchronization, in accordance with an embodiment of the present invention.

Turning now to FIG. 2, a flow diagram illustrating a method for frame synchronization is shown, according to one embodiment of the invention. To describe the method, reference will be made to FIG. 1, although it is understood that the method can also be implemented with reference to any other suitable embodiment of the present invention. For example, the method can be implemented in base station apparatus such as that described below by reference to FIG. 3. In another embodiment, the method can be implemented in a computer-readable storage element having computer readable code stored thereon for programming a computer to perform the method. Moreover, the method can contain a greater or a fewer number of steps than those shown in FIG. 2.

At step 202, a base station determines the start time of the reception of a downlinik frame received from each of one or more additional base stations in a network. For example, the base station 102 receives a downlinik frame transmitted by the base station 104 and/or 106. Further, the base station 102 determines the time at which a downlinik frame received by it is transmitted by the base station 104 and 106. At step 204, the base station 102 determines a radio frequency propagation delay associated with the downlinik frame(s) received from base stations 104 and 106. In an embodiment of the present invention, the radio frequency propagation delay is the amount of time a radio wave takes to travel from its source to its destination. One example of this is the time taken by the transmission frame from base station 104 to travel to the base station 102.

At step 206, a reference downlink frame transmission time at the base station 102 is determined, based on the reception start time of the downlink frame and the radio frequency propagation delay associated with one of the base stations, e.g., 104 or 106. As a result, transmission of frames by the base station 102 can be synchronized with base station 104 and also ideally 106.

Figure 3:
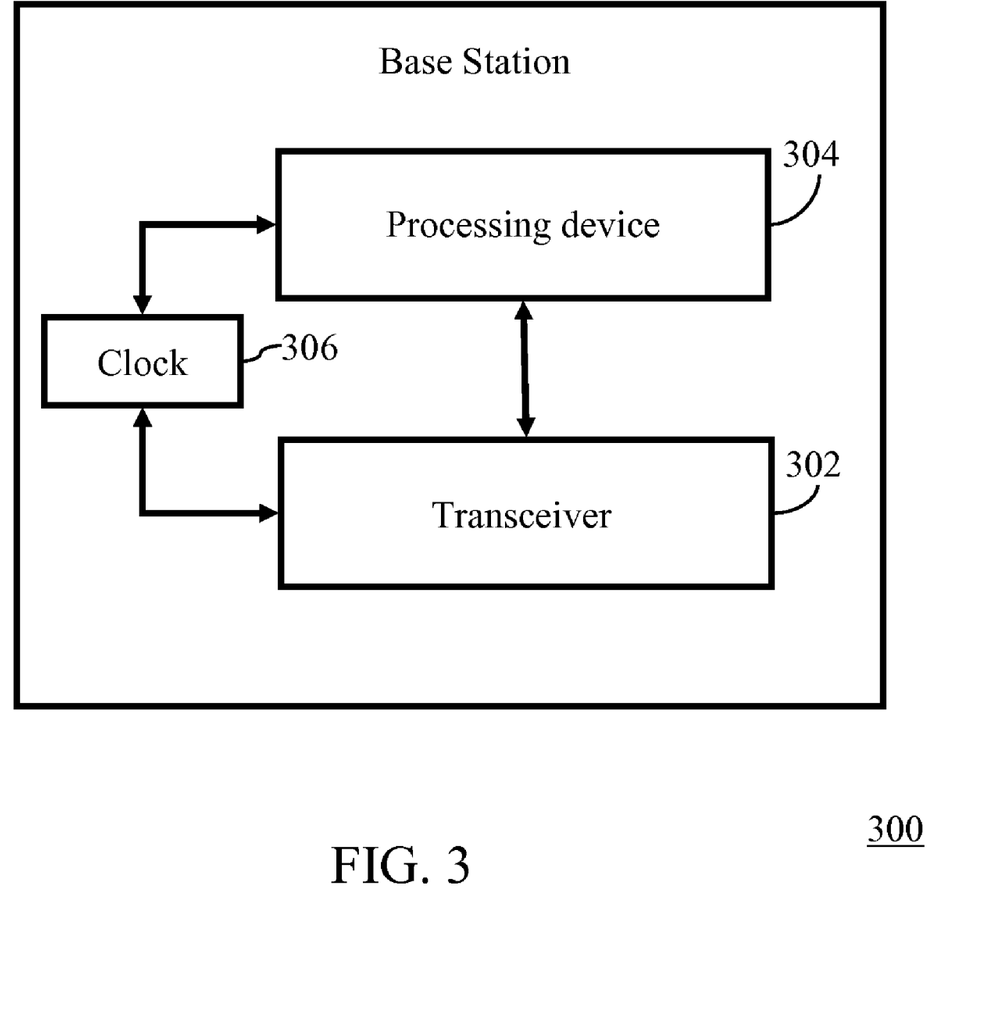
FIG. 3 illustrates a block diagram of a base station apparatus, in accordance with an embodiment of the present invention.

Referring to FIG. 3, an apparatus 300 of an exemplary base station (e.g., base station 102, 104, 106) is shown, according to various embodiments of the present invention. The exemplary base station apparatus includes any suitable transceiver 302 and a processing device 304, for example configured in accordance with one or more of the processing devices described above.

The transceiver 302 in the base station apparatus 300 receives a downlink frame from each of one or more base stations in the network, for example, the base stations 104 and 106. The transceiver 302 is operatively coupled (functionally and/or physically) to the processing device 304. The processing device 304 determines a start time of a reception of the downlink frame received from the base stations 104, 106. The processing device 304 also determines a radio frequency propagation delay associated with each downlink frame. Further, the processing device 304 determines a reference downlink frame start time based on the reception start time of the downlink frame and the radio frequency propagation delay associated with a downlink frame received from one of the base stations. In an embodiment of the present invention, the processing device 304 also determines multiple reference downlink frame transmission times instead of only one reference downlink frame transmission time, in accordance with the various techniques described herein. Each reference downlink frame transmission time is associated with a different base station. In this embodiment, the processing device 304 selects the reference downlink reference transmission time from the multiple reference downlink frame transmission start times, based on at least one parameter. By multiple base stations in a network implementing method 200 using a common parameter for selecting the reference downlink transmission start time, these base stations can substantially synchronize their transmissions to a common time.

For example, the at least one parameter can include selecting the reference downlink frame transmission start time occurring first or earliest in time among the multiple reference downlink frame transmission start times. In another embodiment of the present invention, the at least one parameter includes selecting the reference downlink frame transmission start time occurring last or latest in time among the multiple reference downlink frame transmission start times. In an embodiment of the present invention, the first base station apparatus 300 also includes a clock 306 that can include any conventional clock. The clock is coupled to transceiver 302 and the processing device 304 and provides the timing used by the processing device 304 to determine each reception start time and radio frequency propagation delay.

Figure 4:
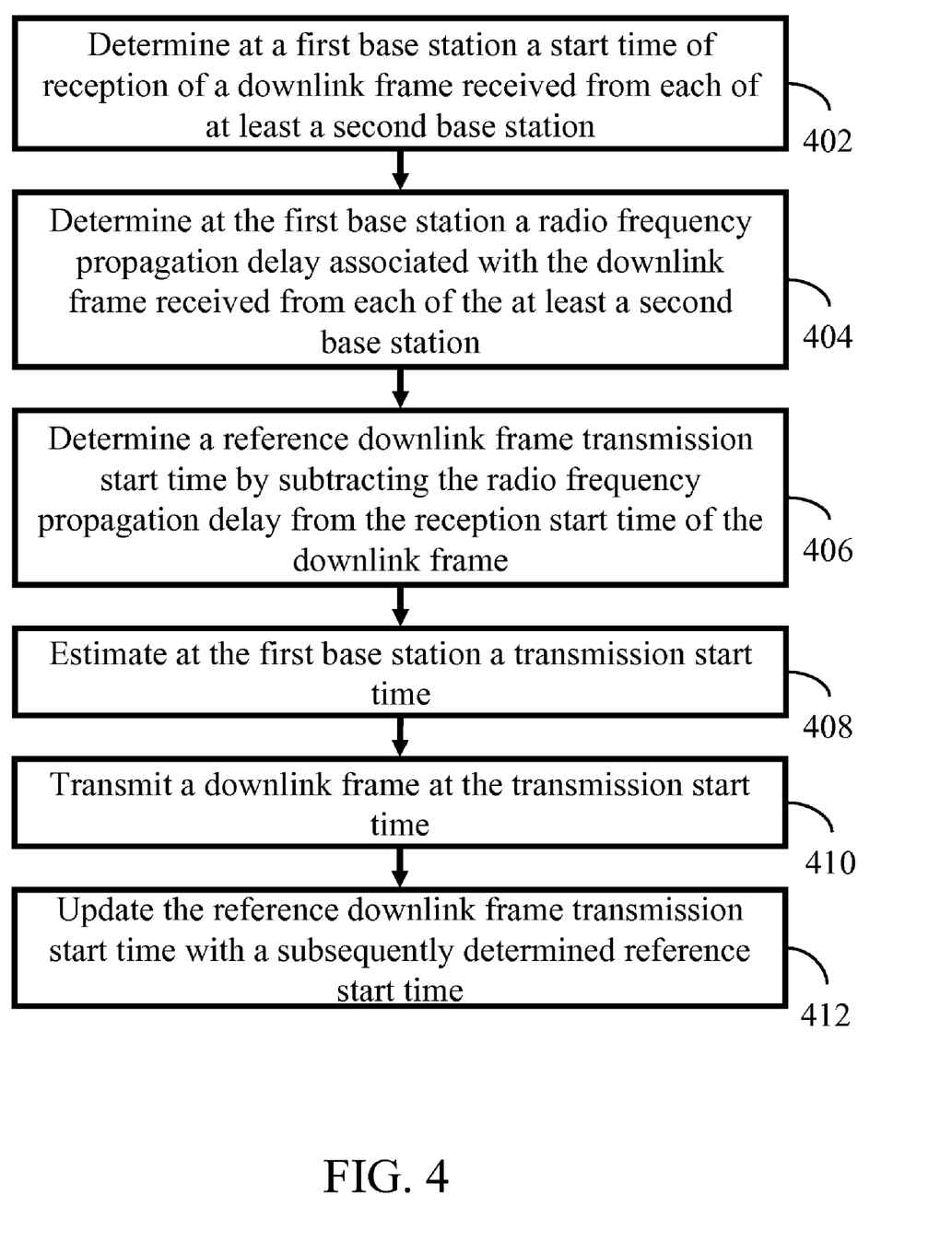
FIG. 4 is a flow diagram illustrating a method for frame synchronization, in accordance with another embodiment of the present invention.

Turning now to FIG. 4, a method for frame synchronization is shown, according to one embodiment of the present invention. To describe the method, reference will be made to FIG. 1. At step 402, a base station, for example, the base station 102, determines the start time for the reception of a downlink frame received from each of one or more other base stations, for example, the base station 104 and the base station 106. At step 404, the base station 102 determines a radio frequency propagation delay associated with the downlink frame received from the base stations 104 and 106. In one embodiment, to determine the radio frequency propagation delay, the first base station acts as a subscriber unit (such as a mobile device) and performs uplink ranging functionality that is well known in the art and that is normally reserved for subscriber units, to determine a timing advance. Uplink ranging with respect to multiple base stations involves automatically adjusting the transmission of a frame and the time at which a base station begins transmission of the frame. For example, the uplink ranging can be performed between the base station 102 the base stations 104 and 106, to determine a timing advance associated with each base station. Typically, the timing advance can be defined as a round-trip time interval required for an RF signal to travel from a base station to a subscriber and back. In an embodiment of the present invention, the radio frequency propagation delay is half of the associated timing advance.

At step 406, a reference downlink frame transmission time at the base station 102 is determined by subtracting the radio frequency propagation delay estimated at step 404 from the reception start time of the downlink frame estimated at step 402. In an embodiment of the present invention, the reference downlink frame transmission time at the base station 102 is estimated based on determining multiple reference downlink frames transmission start times. The multiple reference downlink frame transmission start times can be, respectively, associated with base stations 104 and 106, for instance. Further, the reference downlink frame transmission start time is selected from the multiple reference downlink frame transmission start times, based on at least one parameter that may include, but is not limited to, the selected reference downlink frame transmission start time occurring first or last among the multiple reference downlink frames transmission start times. Use of some other suitable parameters and/or function(s) is also within the scope of the teachings herein.

At step 408, the transmission start time of the first base station is estimated, based on the reference downlink frame transmission start time determined at step 406. In an embodiment of the present invention, the estimation of the transmission start time includes determining the interval time period between a first and a second downlink frame received from the at least a second base station. Further, a multiple of the time interval period is added to the reference downlink frame transmission start time, to estimate the transmission start time at some time in the future (from the reference downlink frame transmission time). The base station can "determine" the interval time period in a number of ways including, for example, the base station being pre-configured with the interval time period. In another exemplary implementation, the base station receives the interval time period from an external source such as another base station or a server (not shown) in the network. In yet another exemplary implementation the base station can, using its processing device and internal clock, calculate or estimate the interval time period by determining an amount of time lapsed between receipt of two (e.g., consecutive) downlink frames from another base station.

At step 410, the first base station transmits a downlink frame at the estimated transmission start time. At step 412, the reference downlink frame transmission start time is updated with a subsequently determined reference downlink frame transmission start time. Typically, reference downlink frame transmission times are updated when there is a difference between the subsequently determined reference downlink frame transmission start time and the reference downlink frame transmission start time currently used by the first base station to synchronize its downlink frame transmission with other bases stations in the network. Such a timing difference can be caused, for example, by respective (and different) clock drifts in the base stations. In an embodiment of the present invention, the reference downlink frame transmission start time is updated by iteratively performing at least steps 402 and 406. Moreover, the reference downlink frame transmission start time can be iteratively updated based on a predetermined time period, to limit or reduce the instances in time where the base stations transmissions are not synchronized. In an alternative implementation, the reference downlink frame transmission start time is iteratively updated based on a random time period.

Figure 5:
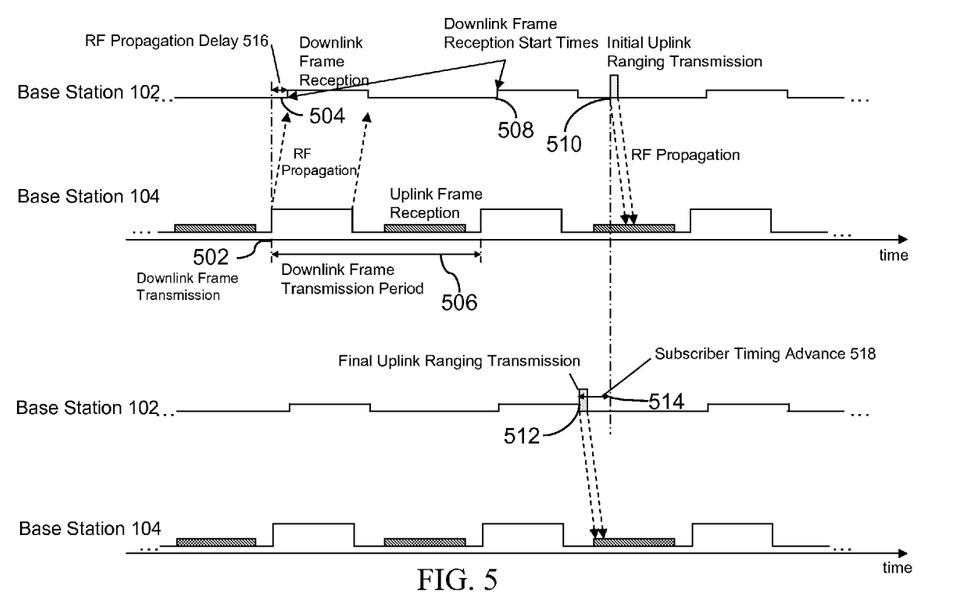
FIG. 5 is a chart illustrating a timing diagram for frame synchronization in a communication network, in accordance with an embodiment of the present invention.
Figure 6:
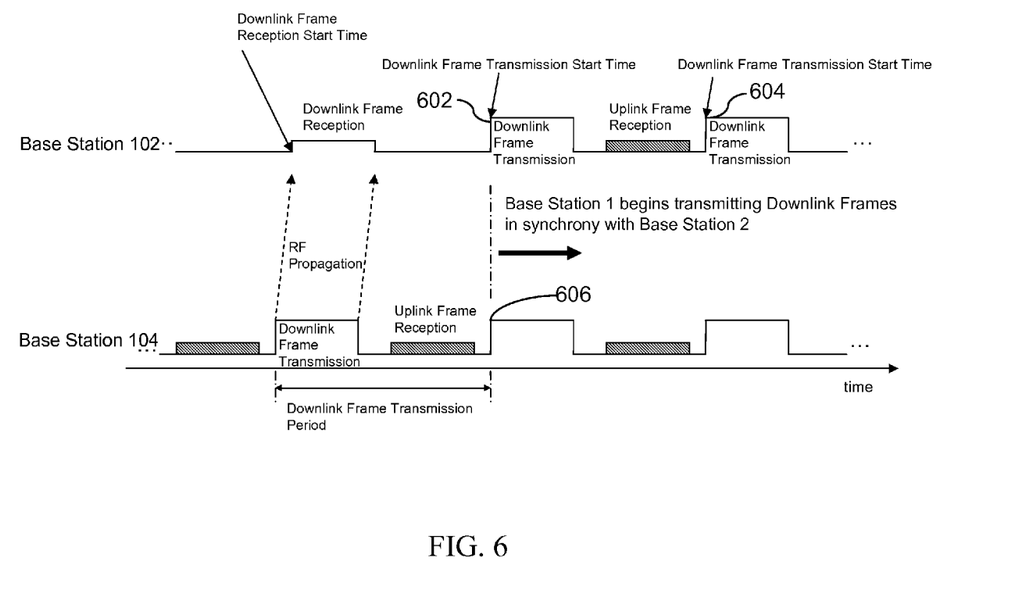
FIG. 6 is a chart illustrating a timing diagram for frame synchronization in a communication network, in accordance with an embodiment of the present invention.

Referring to FIG. 5 and FIG. 6, charts illustrating a timing diagram for frame synchronization in the communication network 100 is shown, according to various embodiments of the present invention. At a time instant 502, the base station 104 transmits a downlink frame according to the internal clock. At a time instant 504, the base station 102 receives a downlink frame from the base station 104 with a propagation delay 516. At a time instant 508, the base station 102 receives another downlink frame from the base station 104, and the base station 102 estimates the downlink frame transmission period 506 of base station 104, based on consecutive downlink frame reception. At a time instant 510, the base station 102 performs initial uplink ranging along with the base station 104. To perform initial uplink ranging, the base station 102 acts as a subscriber to the base station 104. At a time instant 512, final uplink ranging transmission is adjusted, based on the feedback received from the base station 104. At a time instant 514, a subscriber timing advance 518 is estimated. The subscriber timing advance is twice the radio frequency propagation delay. The subscriber timing advance includes the time required for a frame to travel to the base station 104 from the base station 102, and the time required by the response to travel to the base station 102 from the base station 104. The base station 102 then calculates the radio frequency propagation delay, based on the downlink frame received.

At a time instant 602, the base station 102 begins transmission of downlink frames that are synchronized with the transmission of downlink frames by the base station 104. The downlink frame transmission start time is determined by adding the previous downlink frame reception start time estimated at the time instant 508, and the downlink frame transmission period estimated at the time instant 508, and subtracting half of the estimated subscriber timing advance estimated at the time instant 514. This can be represented by the following equation:

'Downlink Frame Transmission Start Time=Previous Downlink Frame Reception Start Time+Downlink Frame Transmission Period−(Subscriber Timing Advance)/2'.

At the time instant 604, the subsequent downlink frame transmission start time is adjusted by adding the previous downlink frame transmission start time 602 and the downlink frame transmission period estimated at the time instant 508. This can be represented by the following equation:

'Downlink Frame Transmission Start Time=Previous Downlink Frame Transmission Start Time+ Downlink Frame Transmission Period'.

As described above, various embodiments of the present invention, as described above, provide a method and base station apparatus for frame synchronization in a communication network. The base stations in the communication network synchronize their frame transmission without the need for external timing reference, for example, a Global Positioning System (GPS). The base station apparatus is less expensive as a result, since it does not require an extra conventional receiver, for example, a GPS receiver, to be installed in it. Further, the base stations can even be synchronized at locations where the reception of signals from the GPS is not clear. Moreover, frame synchronization is more reliable, since it is achieved without relying on external timing reference. In an embodiment of the present invention, the timing clocks at the base stations can be adjusted during operating conditions, for example, while transmission and reception of frames is occurring.

In the foregoing specification, specific embodiments of the present inventions have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about", "near" or any other version thereof, are defined as being close to as understood by one of ordinary skill in the art, and in one non limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method for frame synchronization in a communication network comprising a plurality of base stations, the method comprising a first base station:
   determining at a start time of reception of a downlink frame received from each of one or more second base stations;
   determining a radio frequency propagation delay associated with the downlink frame received from each of the one or more second base stations;
   determining a reference downlink frame transmission start time based on the reception start time of the downlink frame and the radio frequency propagation delay associated with one of the one or more second base stations for use by the first base station in synchronizing its downlink frame transmissions with those of the one or more second base stations;
   estimating a transmission start time based on the reference downlink frame transmission start time by determining a time interval period between first and second downlink frames from the one of the one or more second base stations and adding a multiple of the time interval period to the reference downlink frame transmission start time; and
   transmitting a downlink frame at the estimated transmission start time.

2. The method as recited in claim 1, wherein determining the reference downlink frame transmission start time comprises subtracting the radio frequency propagation delay from the reception start time of the downlink frame associated with the one of the one or more second base stations.

3. The method as recited in claim 1, wherein determining the interval time period comprises one of:
   the first base station being pre-configured with the interval time period;
   the first base station receiving the interval time period from an external source; and
   the first base station calculating the interval time period based on the reception start times of the first and the second downlink frames received from the one of the one or more second base stations.

4. The method as recited in claim 1, wherein determining the radio frequency propagation delay associated with each of the one or more second base stations comprises the first base station acting as a subscriber unit and performing uplink ranging between the first base station and each of the one or more second base stations to determine an associated timing advance.

5. The method as recited in claim 4, wherein each radio frequency propagation delay is determined to be one half of the associated timing advance.

6. The method as recited in claim 1 further comprising the step of updating the reference downlink frame transmission start time with a subsequently determined reference downlink frame transmission start time by iteratively performing the determining the reception start time and determining the reference downlink frame transmission start time steps based on a time interval period that is one of random and predetermined.

7. The method as recited in claim 6, wherein the updating step is performed only upon detecting a timing difference between the subsequently determined reference downlink frame transmission start time and the reference downlink frame transmission start time currently being used by the first base station to synchronize its downlink frame transmissions with those of the one or more second base stations.

8. The method as recited in claim 1, wherein determining the reference downlink frame transmission start time comprises the steps of:
   determining multiple reference downlink frame transmission start times, each being associated with a different one of the one or more second base stations; and
   selecting the reference downlink frame transmission start time from the multiple reference downlink frame transmission start times based upon at least one parameter.

9. The method as recited in claim 8, wherein the at least one parameter comprises the selected reference downlink frame transmission start time occurring earliest in time among the multiple reference downlink frame transmission start times.

10. The method as recited in claim 8, wherein the at least one parameter comprises the selected reference downlink frame transmission start time occurring latest in time among the multiple reference downlink frame transmission start times.

11. A method for frame synchronization in a communication network comprising a plurality of base stations, the method comprising at a first base station:
   determining a start time of reception of a downlink frame received from each of one or more second base stations;
   determining a radio frequency propagation delay associated with the downlink frame received from each of the one or more second base stations;
   determining a reference downlink frame transmission start time based on the reception start time of the downlink frame and the radio frequency propagation delay associated with one of the one or more second base stations for use by the first base station in synchronizing its downlink frame transmissions with those of the one or more second base stations; and
   updating the reference downlink frame transmission start time with a subsequently determined reference downlink frame transmission staff time by iteratively performing the determining the reception start time and determining the reference downlink frame transmission start time steps based on a time interval period,
   wherein the updating is performed only upon detecting a timing difference between the subsequently determined reference downlink frame transmission staff time and the reference downlink frame transmission start time currently being used by the first base station to synchronize its downlink frame transmissions with those of the one or more second base stations.

12. The method as recited in claim 11, wherein determining the interval time period comprises one of:
   the first base station being pre-configured with the interval time period;
   the first base station receiving the interval time period from an external source; and the first base station calculating the interval time period based on the reception start times of the first and the second downlink frames received from the one of the one or more second base stations.

13. The method as recited in claim 11, wherein determining the radio frequency propagation delay associated with each of the one or more second base stations comprises the first base station acting as a subscriber unit and performing uplink ranging between the first base station and each of the one or more second base stations to determine an associated timing advance.

14. The method as recited in claim 13, wherein each radio frequency propagation delay is determined to be one half of the associated timing advance.

15. The method as recited in claim 11, wherein determining the reference downlink frame transmission start time comprises the steps of:
- determining multiple reference downlink frame transmission start times, each being associated with a different one of the one or more second base stations; and
- selecting the reference downlink frame transmission start time from the multiple reference downlink frame transmission start times based upon at least one parameter.

16. The method as recited in claim 15, wherein the at least one parameter comprises the selected reference downlink frame transmission start time occurring either earliest or latest in time among the multiple reference downlink frame transmission start times.

17. The method as recited in claim 11, wherein determining the radio frequency propagation delay associated with each of the second base stations comprises the first base station acting as a subscriber unit and performing uplink ranging between the first base station and each of the second base stations to determine an associated timing advance.

18. The method as recited in claim 17, wherein each radio frequency propagation delay is determined to be one half of the associated timing advance.

19. A method for frame synchronization in a communication network comprising a plurality of base stations, the method comprising at a first base station:
- determining a start time of reception of a downlink frame received from each of a plurality of second base stations;
- determining a radio frequency propagation delay associated with the downlink frame received from each of the second base stations; and
- determining a reference downlink frame transmission start time based on the reception start time of the downlink frame and the radio frequency propagation delay associated with one of the second base stations for use by the first base station in synchronizing its downlink frame transmissions with those of the second base stations, determination of the reference downlink frame transmission start time including:
  - determining multiple reference downlink frame transmission start times, each being associated with a different one of the second base stations; and
  - selecting the reference downlink frame transmission start time from the multiple reference downlink frame transmission start times based upon at least one parameter, the at least one parameter comprising the selected reference downlink frame transmission start time occurring either earliest or latest in time among the multiple reference downlink frame transmission start times.

20. The method as recited in claim 19, wherein determining the interval time period comprises one of:
- the first base station being pre-configured with the interval time period;
- the first base station receiving the interval time period from an external source; and
- the first base station calculating the interval time period based on the reception start times of the first and the second downlink frames received from the one of the second base stations.

* * * * *

UNITED STATES PATENT AND TRADEMARK OFFICE
CERTIFICATE OF CORRECTION

| | | |
|---|---|---|
| PATENT NO. | : 7,701,923 B2 | Page 1 of 1 |
| APPLICATION NO. | : 11/456375 | |
| DATED | : April 20, 2010 | |
| INVENTOR(S) | : Kuehner | |

It is certified that error appears in the above-identified patent and that said Letters Patent is hereby corrected as shown below:

Title Page, Item (56), under "OTHER PUBLICATIONS", in Column 2, Line 4, delete "Metroplitan" and insert -- Metropolitan --, therefor.

IN THE SPECIFICATION

In Column 2, Line 13, delete "invention" and insert -- invention. --, therefor.

In Column 5, Line 17, delete "downlinik" and insert -- downlink --, therefor.

In Column 5, Line 19, delete "downlinik" and insert -- downlink --, therefor.

In Column 5, Line 21, delete "downlinik" and insert -- downlink --, therefor.

In Column 5, Line 24, delete "downlinik" and insert -- downlink --, therefor.

In Column 10, Line 51, in Claim 11, delete "staff" and insert -- start --, therefor.

In Column 10, Line 57, in Claim 11, delete "staff" and insert -- start --, therefor.

Signed and Sealed this
Twenty-ninth Day of May, 2012

David J. Kappos
*Director of the United States Patent and Trademark Office*